US007885907B1

(12) United States Patent
Yen et al.

(10) Patent No.: US 7,885,907 B1
(45) Date of Patent: Feb. 8, 2011

(54) AUTOMATICALLY CREATING A COMPONENT TO RAPIDLY EVALUATE LOGICAL EXPRESSIONS

(75) Inventors: Wei Yen, Los Altos Hills, CA (US); Ian Wright, Mountain View, CA (US); Xiaoyuan Tu, Sunnyvale, CA (US); Stuart Reynolds, Palo Alto, CA (US); Charles Musick, Belmont, CA (US); John Funge, Sunnyvale, CA (US); Daniel Dobson, Atherton, CA (US)

(73) Assignee: AiLive, Inc., Mountain View, CA (US)

( * ) Notice: Subject to any disclaimer, the term of this patent is extended or adjusted under 35 U.S.C. 154(b) by 769 days.

(21) Appl. No.: 11/931,966

(22) Filed: Oct. 31, 2007

(51) Int. Cl.
  *G06F 17/00* (2006.01)
  *G06N 5/00* (2006.01)
(52) U.S. Cl. ...................................................... 706/45
(58) Field of Classification Search ................ 706/45
  See application file for complete search history.

(56) References Cited

PUBLICATIONS

R. Kohavi, "Bottom-Up Induction of Oblivious Read-Once Decision Graphs", Proceedings of the twelfth national conference on Artificial intelligence, pp. 613-618, 1994.*
M. Fujita, Y. Matsunaga, and T. Kakuda, "On Variable Ordering of Binary Decision Diagrams for the Application of Multi-Level Logic Synthesis", Proceedings of the European Conference on Design Automation, pp. 50-54, 1991.*
N. Asahi, M. Akazawa, and Y. Amemiya, "Binary-Decision-Diagram Device", IEEE Trans. on Electron Devices, vol. 42, No. 11, 1999-2005, Nov. 1995.*

* cited by examiner

*Primary Examiner*—Donald Sparks
*Assistant Examiner*—Vincent M Gonzales
(74) *Attorney, Agent, or Firm*—Joe Zheng (57) ABSTRACT

Methods and systems capable of creating a component for determining which subset of a set of logical expressions are true with relatively few evaluations of the primitives that, together with any standard logical connectives, make up the logical expressions.

23 Claims, 11 Drawing Sheets

201 !myHealthIsLow && myEnergyIsLow

202 !nearestEnemyIsAttacking && !nearestEnemyIsClose && (myHealthIsLow || myEnergyIsLow)

203 nearestEnemyIsAttacking && !nearestEnemyIsClose && myHealthIsLow && myEnergyIsLow 204 nearestEnemyIsAttacking && nearestEnemyIsClose && myHealthIsLow 205 nearestEnemyIsAttacking && nearestEnemyIsClose && myHealthIsLow && !myEnergyIsLow 206 nearestEnemyIsAttacking && nearestEnemyIsClose && myHealthIsLow && myEnergyIsLow 207 nearestEnemyIsAttacking && nearestEnemyIsClose && mySwordIsDamaged 208 etc.

Figure 2: Example Logical Expressions from the Preferred Embodiment.

Figure 3: Abstract Example of Logical Expressions.

Figure 4: Abstract Example of Primitives.

Figure 5: Abstract Example of Primitive Lists for the Primitives A, B, C, and D.

Figure 6: Abstract Example of a Truth Table.

FIG. 7

Figure 8: Abstract Example of a Feature Tree.

Figure 9: Feature Tree from Figure 8 with Merged Sub-Trees.

AUTOMATICALLY CREATING A COMPONENT TO RAPIDLY EVALUATE LOGICAL EXPRESSIONS

BACKGROUND OF THE INVENTION

The academic field of machine learning studies systems and methods for learning associations between inputs and outputs. The exact nature of the inputs, techniques and outputs depend upon the domain of application.

The inputs to a machine learning technique are typically referred to as "features" or "attributes". It is often desirable to make learning techniques operate as quickly as possible, in particular, in real-time or in near real-time. Sometimes, a major obstacle to achieving faster performance is creating a component that can rapidly compute the values of some of the input features.

In some cases, a class of input features sometimes known as "Boolean-valued input features" is pertinent to a particular application of machine learning. For example, in the context of computer games, inputs to the learning technique typically include features that characterize the current game situation in which a game character finds itself. For example, it might be pertinent whether the game character is under attack by a nearby enemy and low on health, or in contrast, the game character in question might be full of health and heading toward a large tree. Another kind of input feature that is useful for certain problems are features that characterize certain objects. For example, a game character may need to know the identity of the most dangerous enemy within attack range, as well as the identity of the nearest enemy with a sword.

Boolean-valued input features are features that can be either true or false. Boolean-valued input features are usually defined by a logical expression comprised of one or more dependent features composed together using any standard logical operators such as and (&&), or (||), not (!), equality (==), less than (<), less than or equal to (<=), greater than (>), greater than or equal to (>=), not equal to (!=) and parentheses. The dependent features are sometimes referred to by the inventors as the primitives.

Boolean-valued input features represent one example of how the need to create a component to rapidly evaluate sets of logical expressions occurs naturally within the context of machine learning. But in many other sub-fields of artificial intelligence (AI), as well as other areas such as electronic circuits, the need for a component to rapidly evaluate sets of logical expressions is commonplace.

SUMMARY OF THE INVENTION

The invention provides techniques, including methods and systems, capable of creating a component, as described in U.S. patent application Ser. No. 11/699,201, for rapidly determining which subset of a set of logical expressions are true. In one embodiment, the invention defines a set of input features to some machine learning technique, each input feature defined by a separate logical expression. The logical expression is typically constructed from logical connectives, relational operators, parentheses and primitives. The truth or falsity of each logical expression is determined by the current values of the primitives and the standard rules of mathematical logic. The semantics of each of the primitives is determined by the particular application in question. For example, in one application a primitive "temperature" might reflect the current temperature of some chemical reaction being monitored. In another application, a primitive with the same name might reflect the last broadcast temperature in the Bahamas.

Primitive values typically change over time. When the value of a primitive changes, any logical expression that mentions that primitive may, depending on its structure, change too. For example, the input feature "is Cold" might be represented by the logical expression "temperature<0". In which case, if the temperature drops from the 5 degrees to −3 degress, then the input feature "is Cold" will change from being false to true. Whereas if the temperature where to rise from 7 degrees to 9 degrees, then the input feature "is Cold" would remain unchanged; in particular, its value would remain false.

The invention also defines a system and method of creating a plurality of directed acyclic graphs (DAGs), each graph including at least one root node, at least one leaf node, and at least one non-leaf node associated with a leaf node. Each node is associated with a, possibly empty, subset of presumed to be true logical expressions of the set of logical expressions. Each non-leaf node is associated with one of the primitives mentioned in any of the logical expressions. Edges are defined between pairs of the nodes, each edge being associated with a possible value, or range of possible values, of the primitive associated with the node at the tail of the edge. Paths are defined through each of the directed acyclic graphs from a root node to a leaf node by recursively following each edge corresponding to the current value of the primitive at a selected non-leaf node. Lastly, subsets of logical expressions associated with the nodes on the defined paths are collated to yield a subset of logical expressions that are true.

In one embodiment, the logical expressions are obtained as the union of the logical expressions that define the tests in a collection of specialists from some learning element.

In one embodiment, there are one or more steps associated with converting the logical expressions, if necessary, to disjunctive normal form (DNF).

In one embodiment, there are one or more steps associated with identifying all the primitives mentioned in those DNF expressions.

In one embodiment, there are one or more steps associated with constructing a set of one or more spanning sets from those DNF expressions according to those identified primitives.

In one embodiment, there are one or more steps associated with constructing one or more truth tables associated with those spanning sets.

In one embodiment, there are one or more steps associated with constructing a set of DAGs associated with those truth tables.

In one embodiment, there are one or more steps associated with persisting out the DAGs onto some physical media.

In one embodiment, there are one or more steps associated with persisting in the DAGs into some computer game in order to facilitate the rapid evaluation of those logical expressions.

Besides the application to Boolean-valued input features in the field of machine learning algorithms, there are many other AI techniques that require the fast evaluation of a set of logical expressions. The invention is therefore potentially important in those fields as well.

In addition to outputting data for use with a general-purpose computer, the invention can output the circuit design for special purpose hardware. The biggest advantage of building the corresponding hardware is that the resulting circuit, for computing the subset of logical expressions that are true, typically requires significantly less gates than circuits resulting from other techniques.

DETAILED DESCRIPTION

Generality of the Description

This application should be read in the most general possible form. This includes, without limitation, the following:

References to specific structures or techniques include alternative and more general structures or techniques, especially when discussing aspects of the invention, or how the invention might be made or used.

References to "preferred" structures or techniques generally mean that the inventor(s) contemplate using those structures or techniques, and think they are best for the intended application. This does not exclude other structures or techniques for the invention, and does not mean that the preferred structures or techniques would necessarily be preferred in all circumstances.

References to first contemplated causes and effects for some implementations do not preclude other causes or effects that might occur in other implementations, even if completely contrary, where circumstances would indicate that the first contemplated causes and effects would not be as determinative of the structures or techniques to be selected for actual use.

References to first reasons for using particular structures or techniques do not preclude other reasons or other structures or techniques, even if completely contrary, where circumstances would indicate that the first reasons and structures or techniques are not as compelling. In general, the invention includes those other reasons or other structures or techniques, especially where circumstances indicate they would achieve the same effect or purpose as the first reasons or structures or techniques.

After reading this application, those skilled in the art would see the generality of this description.

Definitions

The general meaning of these terms is intended to be illustrative and not limiting in any way. The scope and spirit of the invention is not limited to any of these definitions, or to specific examples mentioned therein, but is intended to include the most general concepts embodied by these and other terms.

Figure 1:
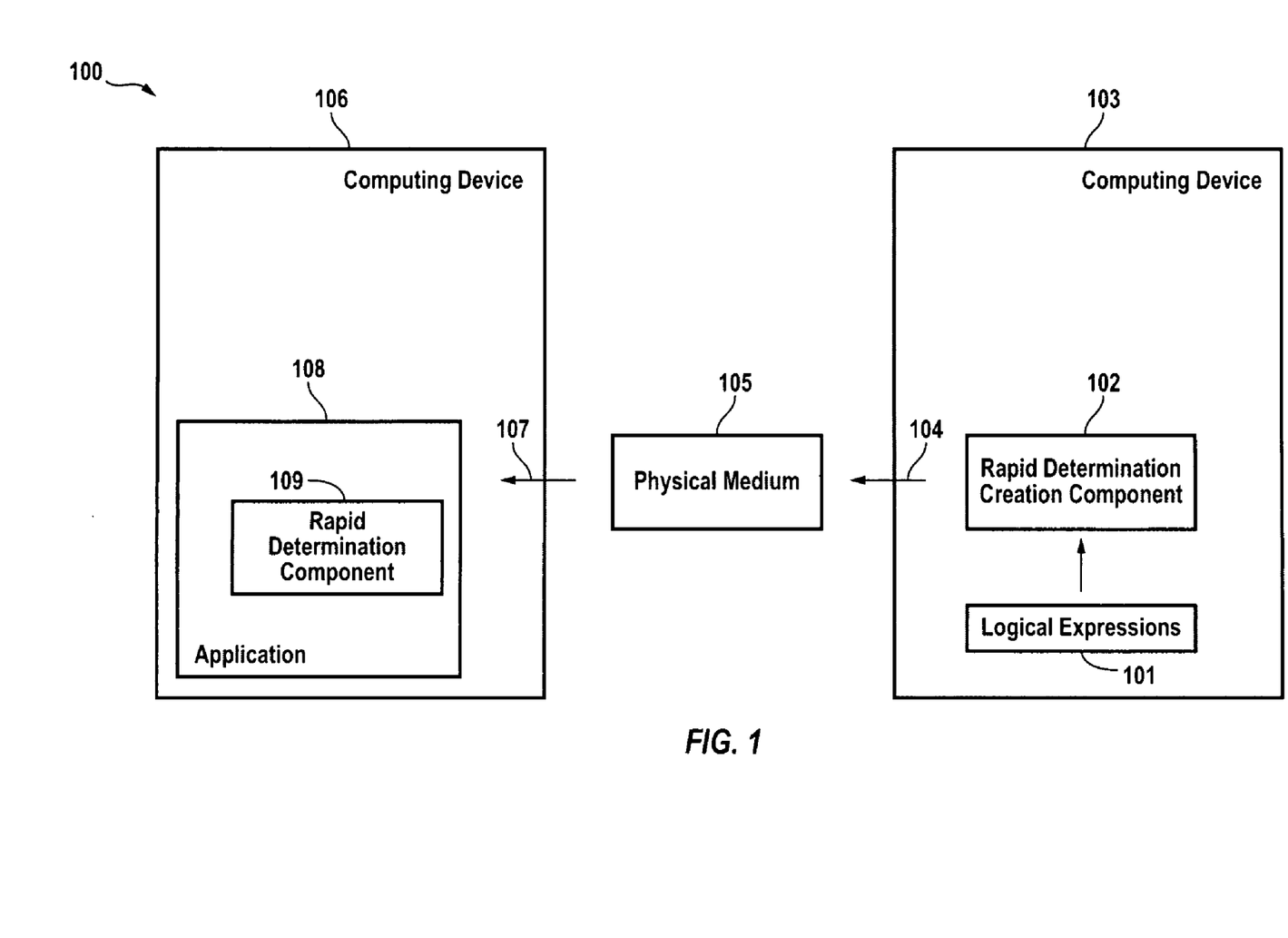
FIG. 1 shows a general overview of features in the context of machine learning.

FIG. 1

FIG. 1 shows (100) a possible setup for how the invention can be used. In particular, some arbitrary set of logical expressions (101) are provided to the rapid determination creation component (102). The creation component (102) runs on some computing device (103) and outputs (104) a component that can rapidly determine which subset of the expressions (101) are currently true. In one the preferred embodiment the rapid determination component consists of a set of so called feature trees. The output (104) of the creation component (102) can be stored on some physical medium (105). Of course, the physical medium need not be directly attached to the computing device, but could instead be reachable over some network. The stored data might also be made accessible to other computing devices over some network.

The stored output can then be loaded (107) to create a copy of the stored data in the working memory of a possibly different computing device (106). That second computing device need not be as powerful or have all the same resources as the first computing device (107). In one embodiment, the first computing device (103) includes a standard PC and the second computing device (106) includes a games console. Of course, the two computing devices (103) and (106) could be the same device.

Once the determination component has been loaded into memory (109) it can be used to rapidly determine which subset of logical expressions are true. This information is typically used by some application (108) to help perform some task more rapidly than would otherwise be possible. In one embodiment code to interact with (109) will have been linked or compiled in to the application (108). This is standard practice in the software industry. That is, some vendor provides a library for a customer to link or compile into their application so that their application can take advantage of the capabilities provided by the vendor's library. In this case, the library allows the rapid determination component to be loaded and queried to determine which subset of logical expressions are true.

Of course, there are other ways to include the rapid determination component in an application. For example, the output (104) need not be data. Instead, it could be code to be compiled into the application (108). That code representing not only the rapid determination component, but also some or all of the library code required to interact with the rapid determination component. Or it could be a dynamic loadable library (DLL) that could be loaded by the application (108). In fact, any of the industry standard ways by which vendors distribute code, or data to be interpreted by their code, are included in the possibilities for the form of the output (104).

In one embodiment the logical expressions (104) are generated from input provided by game developers that identify important contexts in their game. The output (104) is created by the developer on computing device (103), e.g., including a standard PC. The application (108) is build for some other computing device (106), e.g., including a games console. A vendor supplied library is linked in to the application and the developer inserts calls into their application to that library. The compiled application code, together with the data for the rapid determination component are placed on some physical medium and sold as a video game.

When the game is played the calls into the library result in the rapid determination component being loaded into the games consoles memory. Subsequent calls enable game characters to learn from the character controlled by the game player and this learning is performed rapidly, in part, because of the ability to rapidly determine which of the important game contexts specified in (104) are true. See U.S. patent application Ser. No. 11/699,201, for more details on how the rapid determination component might be used and is preferably used.

In software development a common problem is how to make tools that are both general and fast. Commonly a tradeoff has to be made between the two. This problem manifests itself in the specific context of fast evaluation of Boolean expressions by requiring either a set of expressions that are fixed in advance, or by requiring a relatively slow general-purpose technique for evaluating the expressions. By introducing systems and methods that enable a developer to compile any general set of expressions into a specific data-structure that can quickly evaluate which subset are true, the invention represents a novel solution to circumventing this problem. As noted herein, the logical expressions can be any set of logical expressions, so they are completely general. But then the invention creates a device that is specific to that set of equations, so it can be extremely fast in determining the subset of true expressions.

Figure 2:
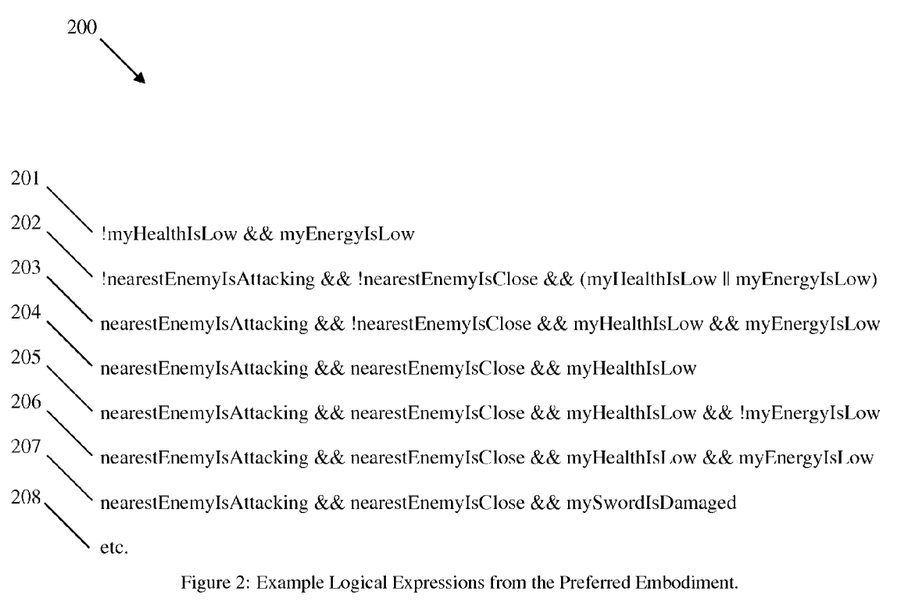
FIG. 2 shows an example set of logical expressions of the type that arise in one preferred embodiment.

FIG. 2

FIG. 2 shows (200) an example of a possible set of logical expressions. For example, they could be the unique tests associated with specialists as in U.S. patent application Ser. No. 11/699,201. But for the purposes of the invention it is not important where they came from. The invention can create an equivalent set of feature trees from any set of logical expressions.

The non-logical symbols are like those found in one embodiment and their semantics could be something like:

nearestEnemyIsAttacking: Is true if the nearest enemy to the NPC from whose point of view the logical expressions are being evaluated is attacking the NPC, and false otherwise.

nearestEnemyIsClose: Is true if the nearest enemy to the NPC from whose point of view the logical expressions are being evaluated is within some specified distance, and false otherwise myHealthisLow: Is true if the NPC from whose point of view the logical expressions are being evaluated has low health.

myEnergyisLow: Is true if the NPC from whose point of view the logical expressions are being evaluated has low energy.

mySwordIsDamaged: Is true if the NPC from whose point of view the logical expressions are being evaluated has a damaged sword.

The etc. (208) is meant to indicate that there could be a large number of logical expressions. The inventors have discovered that even relatively simple game applications can easily generate thousands of logical expressions.

Figure 3:
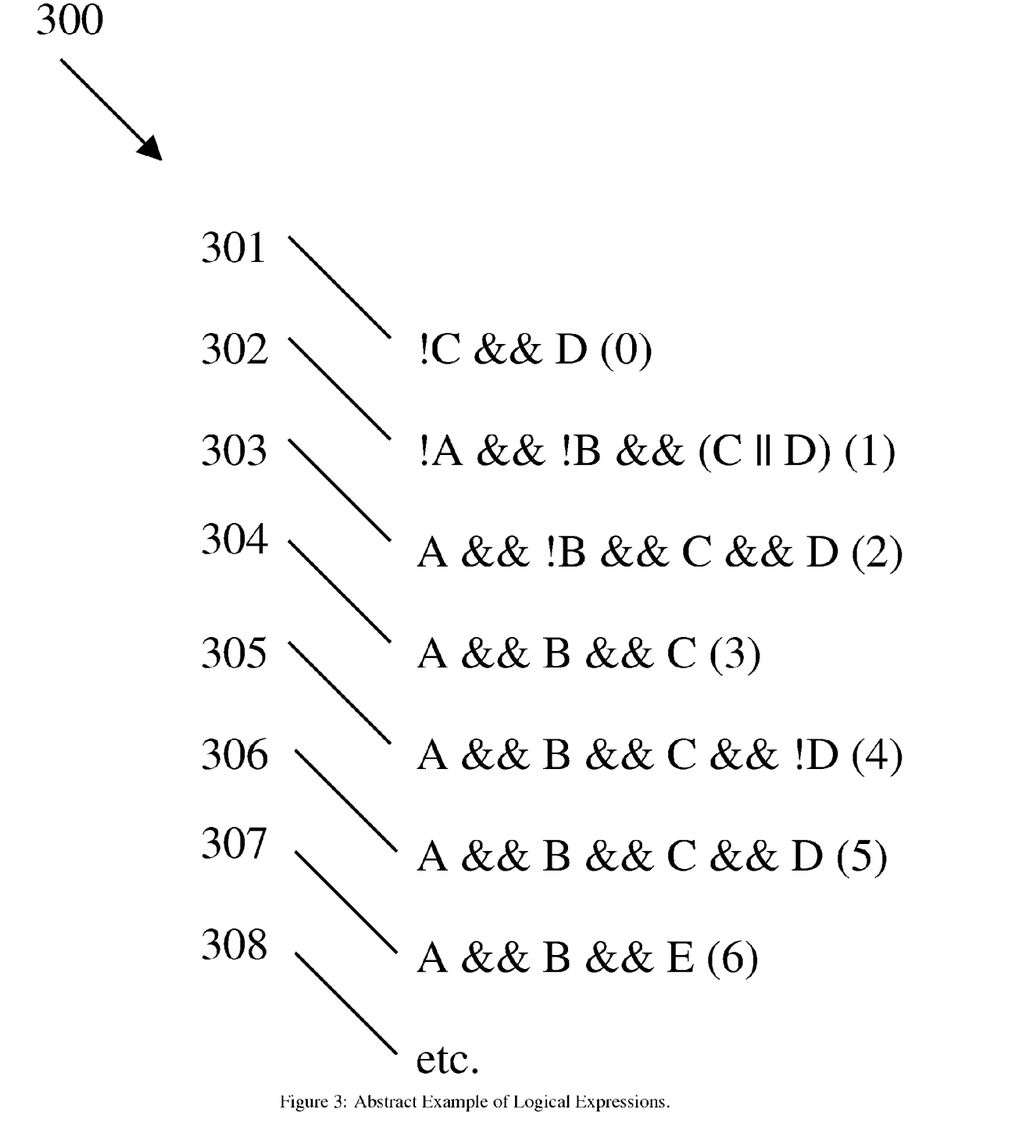
FIG. 3 shows an example of an abstract set of logical expressions.

FIG. 3

FIG. 3, shows (300) an abstract set of logical expressions. For the purposes of the abstract example, it is left deliberately unspecified what the semantics of the non-logical symbols actually are, but they could correspond to any subroutine or program code. In particular they could correspond to game-dependent terms shown in FIG. 2, such as "myHealthIsLow", or "nearestEnemyIsAttacking". In other applications, they could correspond to terms such as "itIsRaining" that require determining some aspect of the real world. For the purposes of the invention, there is no particular requirement regarding the nature of any particular non-logical symbol, so long as that there is some way to determine, or look up, the last known, or recent, value of a non-logical symbol.

FIG. 3 shows that the same non-logical symbols appear repeatedly in each logical expression. These repeated occurrences of a small number of primitives that can be exploited in creating a device that rapidly evaluates the logical expressions by reducing the number of times the non-logical symbols have to be evaluated.

The numbers in brackets label each logical expression. For example, logical expression 2 is "A && !B && C && D" (303). In one embodiment, these labels correspond to as the number of the unique test. So if the logical expression number 2 was true, the inventors would sometimes say the unique test 2 was active, or equivalently, the list of active unique tests (AUTs) includes test number 2.

Note that, computer scientists and some programming languages often number things starting from 0. Therefore what might commonly be referred to as the first expression is labeled with a 0 and might sometimes be referred to as the 0th expression. In this description we keep this numbering (i.e., starting from 0) and refer to expressions by that number. Unless otherwise stated, when generically referring to items in a list we use the more conventional form of referring to the first, second, third etc. instead of the zeroth, first, second, etc.

Except for expression number 1 (302), each expression in FIG. 3 is a conjunction, but the invention also applies to provided logical expressions of any form. This is because any logical expression can be converted to some suitable normal form, such as disjunctive normal form (DNF). For example, expression 1 (302) can be converted to (!A && !B && C)|| (!A && !B && D). Once in DNF each clause will be in the form of a conjunction and each unique disjunct can be added as a unique logical expression. For example, !A && !B && C could be added as one expression and !A && !B && D as another. Note that, it is a simple matter to record that a logical expression was originally just one clause of some original larger logical expression in DNF.

The etc. (308) is meant to indicate that there could be a large number of logical expressions.

Figure 4:
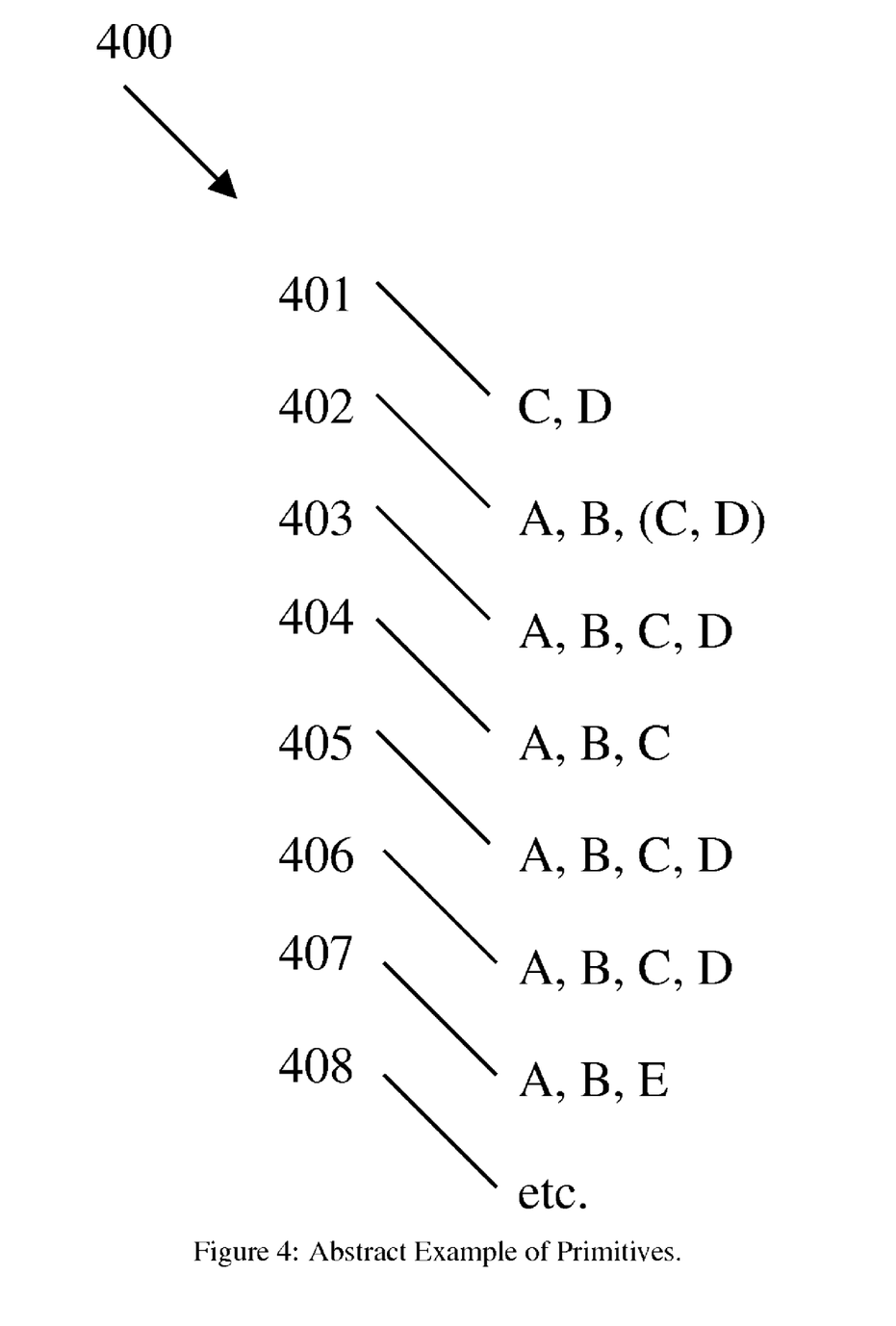
FIG. 4 shows the lists of primitives associated with each of the example logical expressions shown in FIG. 3.

FIG. 4

FIG. 4 shows (400) the list of primitives for each of the logical expressions in FIG. 3. Where a primitive is defined as any non-logical symbol.

The etc. (408) is meant to indicate that there could be a large number of logical expressions.

Figure 5:
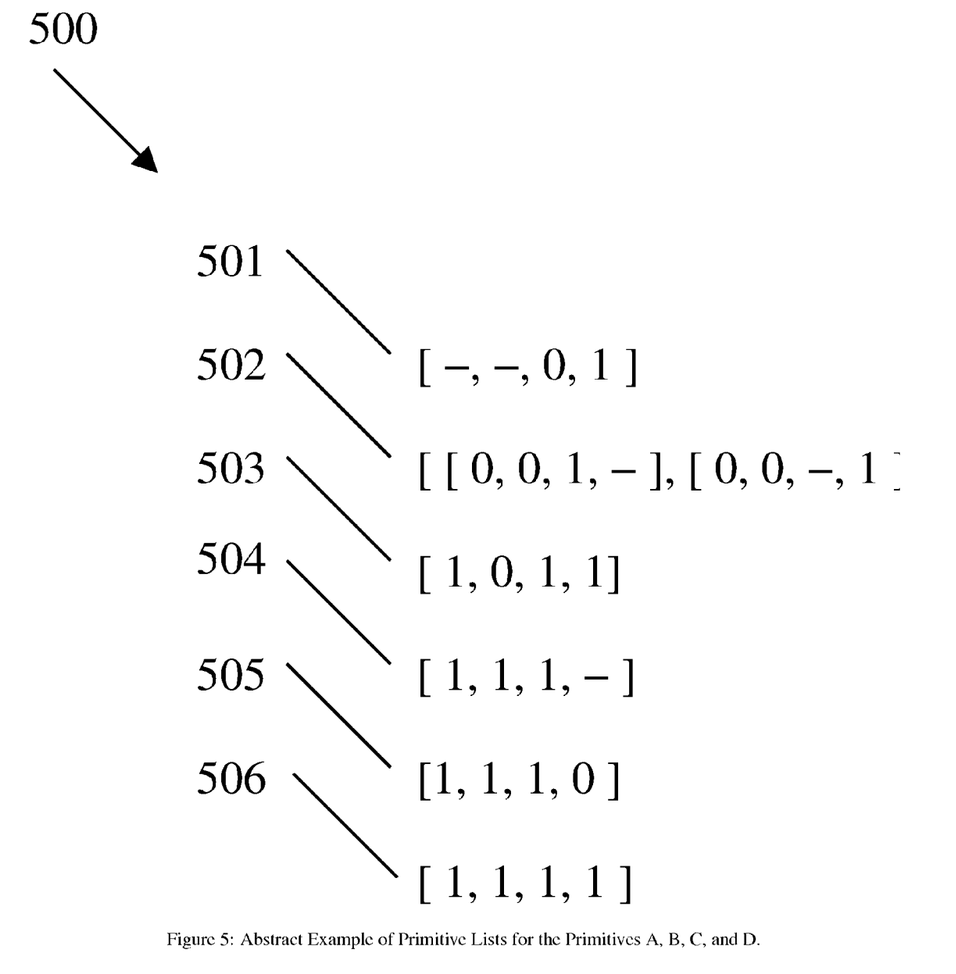
FIG. 5 shows the primitive lists, for the primitives A, B, C, or D, associated with each of the relevant example logical expressions shown in FIG. 3.

FIG. 5

FIG. 5 shows (500) the primitive lists for the logical expressions in FIG. 3 for which the only non-logical symbols that are mentioned are A, B, C, or D.

Note that, we are assuming that none of the logical expressions implied by the etc. (308) in FIG. 3 were built up exclusively from any of the non-logical symbols A, B, C, or D. This assumption is only made to simplify the explanation of the invention contained herein and is obviously not a limitation in any way on the actual invention itself.

In fact, the invention can include a method for selecting the so called spanning sets from which the primitive lists are constructed, where a spanning set is a set of primitives. That set is said to span all the expressions for which the only non-logical symbols that are mentioned are from that set of primitives.

Clearly the set of all primitives that are mentioned in any of the logical expressions spans the entire set of logical expressions. This would result in one large spanning set. However, attempting to build a truth table from one large spanning set is impractical. In particular, the amount of memory required for typical applications is astronomical.

Instead of building one large spanning set to cover the entire set of logical expressions, the inventors have discovered a way to build a set of spanning sets so that the union of those sets spans the entire set of logical expressions, but any single spanning set only spans some subset of the logical expressions. Each single spanning set will, in turn, result in a truth table like those shown in FIG. 6.

To build a set of spanning trees requires some system and method for selecting which primitives will go into which spanning sets. The inventors have discovered that the goal should be to create a small number of spanning sets, such that each set contains as few primitives as possible. The reason for this is that such a set of spanning sets will result in a smaller set of shallower feature trees. The fewer and shallower the feature trees, the faster they can be evaluated.

If any of the spanning sets contains too many primitives, then the memory requirements during construction of the truth tables is likely to be prohibitive. If each spanning set contains too few primitives, then more spanning sets, and hence more feature trees, than are necessary are likely to result.

Therefore choosing the right number of spanning sets with the right primitives in each is important. The inventors have discovered a system and method that is fast and simple and seems to work well in practice. However, the method does not produce the guaranteed optimal set of spanning sets for a given constraint on how much memory is available for the truth table construction stage and so is only a heuristic. The inventors have experimented with modifications to the basic heuristic and some of those variations will be described as well.

In one embodiment, the inventors have discovered that the basic heuristic enables them to span even large sets of expressions (for example around 2000) with two orders of magnitude fewer spanning sets (for example around 30). Most of the spanning sets contain 5 to 10 primitives with one or two more numerous ones. Of course, in general these numbers are very dependent upon the application.

The basic heuristic method is a greedy one that tries to identify small spanning sets first. For example, the method finds the expressions with the least number of primitives mentioned. The method adds a relatively few popular primitives to create the first spanning set. The method removes from consideration all the expressions that are spanned by that first spanning set and repeats, attempting to find further spanning sets meeting similar criteria. At each step the method creates a somewhat larger spanning set and removes the newly spanned equations from consideration before picking a next spanning set.

For example, if there are 2000 logical expressions, the expressions can be sorted according to how many primitives they mention. At the sorted list are the expressions that mention the fewest number of expressions. For example, suppose that one expression only mentions the primitives A and B, then A and B will be added to the first spanning set. Two more primitives will also be added to that first set. The two additional ones will be primitives that are determined, by simple counting, to occur most frequently in the remaining expressions (i.e. the expressions comprised not just of A and B). For example, suppose that C and D are the most frequently occurring primitives in the list of primitives that excludes the primitives that only mention A and B. Then {A, B, C, D} will be the first spanning set. Any expression for which the mentioned non-logical symbols are a subset of the spanning set {A, B, C, D} is now said to be spanned by that set. All such expressions are removed from consideration as the process repeats to build the second spanning set, and so on and so forth.

An alternative criteria for selecting which primitives go into a spanning set is to use statistics gathered at run-time. That is, some initial set of feature trees is created using the basic heuristic method described above. Counts are kept of how often each primitive is evaluated. The feature trees are re-constructed so that when the spanning sets are created the number of evaluations of each primitive is taken into account. This has the effect that primitives that are evaluated frequently are placed ahead of the queue, even if they do not necessarily occur in as many expressions as some other primitive. The relative weighting to give the frequency of evaluation versus frequency of occurrence in the expressions is determined by a selected parameter that might vary between 0 and 1. A value of 0 corresponds to ignoring the run-time statistics, in which case the method is equivalent to the heuristic method described above. A value of 1 corresponds to only using the run-time statistics. Since the run-time statistics depend on the structure of the feature trees and what happens in the game world during testing, it is possible that several iterations of creating statistics and re-building the trees might be necessary.

Another variation of the basic heuristic method described above is to undo earlier choices about which primitives go into a particular spanning set. For example, if some prior constraint on the number or size of the spanning sets is violated, some of the decisions about which primitives are assigned to which spanning sets could be revisited. This is often possible because there may have been a tie, or a near tie, in the heuristic evaluation of which primitive is chosen for which spanning set.

Once the spanning set has been determined, the primitives in the set are arranged in some order to create a list of primitives. In FIG. 5 the spanning set is {A, B, C, D} and they are arranged in order to create the list [A, B, C, D]. That is, the first entry in the list is A, the second is B, and so on.

It is then a simple matter to create the primitive lists. In particular, for each expression that is spanned by the spanning set, the value that the primitive must take in order to make the expression true is recorded. For example, (501) corresponds to expression 0 (301) in FIG. 3. So for expression 0 to be true, C must be false (indicated by recording a 0) and D must be true (indicated by recording a 1). The required values are placed in a list in the order that corresponds to the order of the primitives in the list of primitives in the spanning set.

If a primitive in the spanning set does not appear in some expression, then that is indicated by some "don't care" symbol in the list of required values for that expression. In the figure, a dash is used to as the "don't care" symbol. The use of "don't care" is one point of departure of the invention in multi-output circuit optimization.

In the figure, (501) is the list [–, –, 0, 1] because to make expression 0 (301) true C must be false, D must be true, the values of A and B are irrelevant, and so on for the other expressions.

In the figure, (502) is of interest because it contains multiple lists. The reason for this is that expression 1 contains a disjunction and so there are three possible assignments of values to C and D that make the disjunction true. That is, C could be true and D could be false; C could be false and D could be true; or C and D could be true. We could obviously have used three lists, one for each case, but in the figure we just use two and take advantage of the "don't care" symbol. That is, the first list covers the case in which C is true, in which case we don't care about D, and the second list covers the case in which D is true, in which case we don't care about C.

Figure 6:
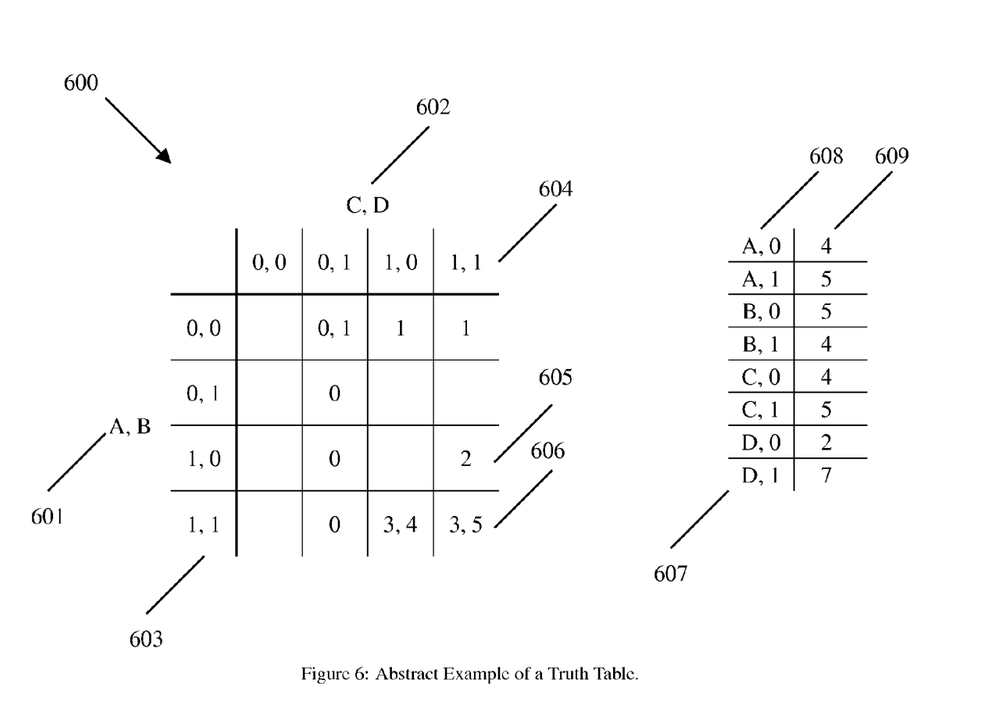
FIG. 6 shows the truth table for the primitive lists in FIG. 5 according to the expressions shown in FIG. 3.

FIG. 6

FIG. 6 shows (600) a truth table. The truth tables are created from the primitive lists in a straightforward way. A truth table is constructed for each spanning set. This has the effect that the size of the truth table grows exponentially in the size of the spanning set. In particular, for a spanning set of size n, the truth table will be of size $2^n$. This is one of the main reasons why it is advantageous not to just pick a spanning set to span all the logical expressions. For example, the inventors have regularly built sets of feature trees for sets of logical expressions built up from hundreds of primitives. The truth table required to represent hundreds of primitives could not be contained in all the computer memory currently available on Earth combined.

Once a truth table has been built for a given spanning set, the entries in the truth table are filled in according to the primitive lists. In particular, a primitive list that does not contain any "don't cares" identifies a cell in the truth table in which the expression number that corresponds to that primitive list should be entered. Don't care symbols mean that multiple cells, corresponding to each value of the don't care primitives, should be filled in with the expression number that corresponds to that primitive list.

In the figure, the possible combinations of values for the primitives A and B (601) are listed in the first column of the table (603). The possible combinations of values for the primitives C and D (602) are listed in the first row of the table (604). The other rows and columns represent the combinations of the primitives A, B, C and D. For example, the fourth row, fifth column represents the case when B is false while A, C, and D are all true. There is a 2 entered in that cell because this is precisely the conditions which make expression 2 from FIG. 3 true. Similarly, the numbers in other cells indicate which expressions from FIG. 3 are true for the assignment of values to the primitives that correspond to that cell.

Note that, for primitive lists with don't care symbols, the expression number must be entered in all the cells that make the expression true. In particular, this will include all possible values for the symbols that we don't care about. For example, D does not appear in expression 3, so we don't care what its value is in determining the value of that expression. Therefore we enter a "3" in the cells that correspond to expression 3 being true for the case when D is true and also in the case when D is false (606).

Note that we enter a "1" in three cells in the second row of the table because of the disjunction in expression 1.

The representation of the truth table in the figure is for pedagogical purposes and may or may not imply anything about the data structure used in any code that implements the invention.

In one embodiment the truth table is stored in a compressed format. This is possible because typically most of the cells in each truth table are empty. A naive storage format wastes memory on storing all these empty cells and causes the process of building trees to go much slower. This is because of the wasted time taken to examine all empty cells. The inventors have discovered that they can speed up the creation of feature trees by at least an order of magnitude by maintaining separate tables that, for each truth table, record the number of cells that have content. The inventors sometimes refer to these tables as "row column (RC) counts". For example, table (607) shows the RC counts for the truth table on the left of (600).

An entry (609) in the RC counts table is determined by looking at the corresponding truth table rows. For example, primitive A has value 0 (608) in rows 1 and 2 of the truth table. In those 2 rows precisely 4 cells have content. That is the cells corresponding to the truth assignments 0001, 0010, 0011 and 0101 each has content, but none of the others do. Note that the cell corresponding to 0001 actually has two AUTs listed, but for the RC counts we only record if there is content or not.

Figure 7:
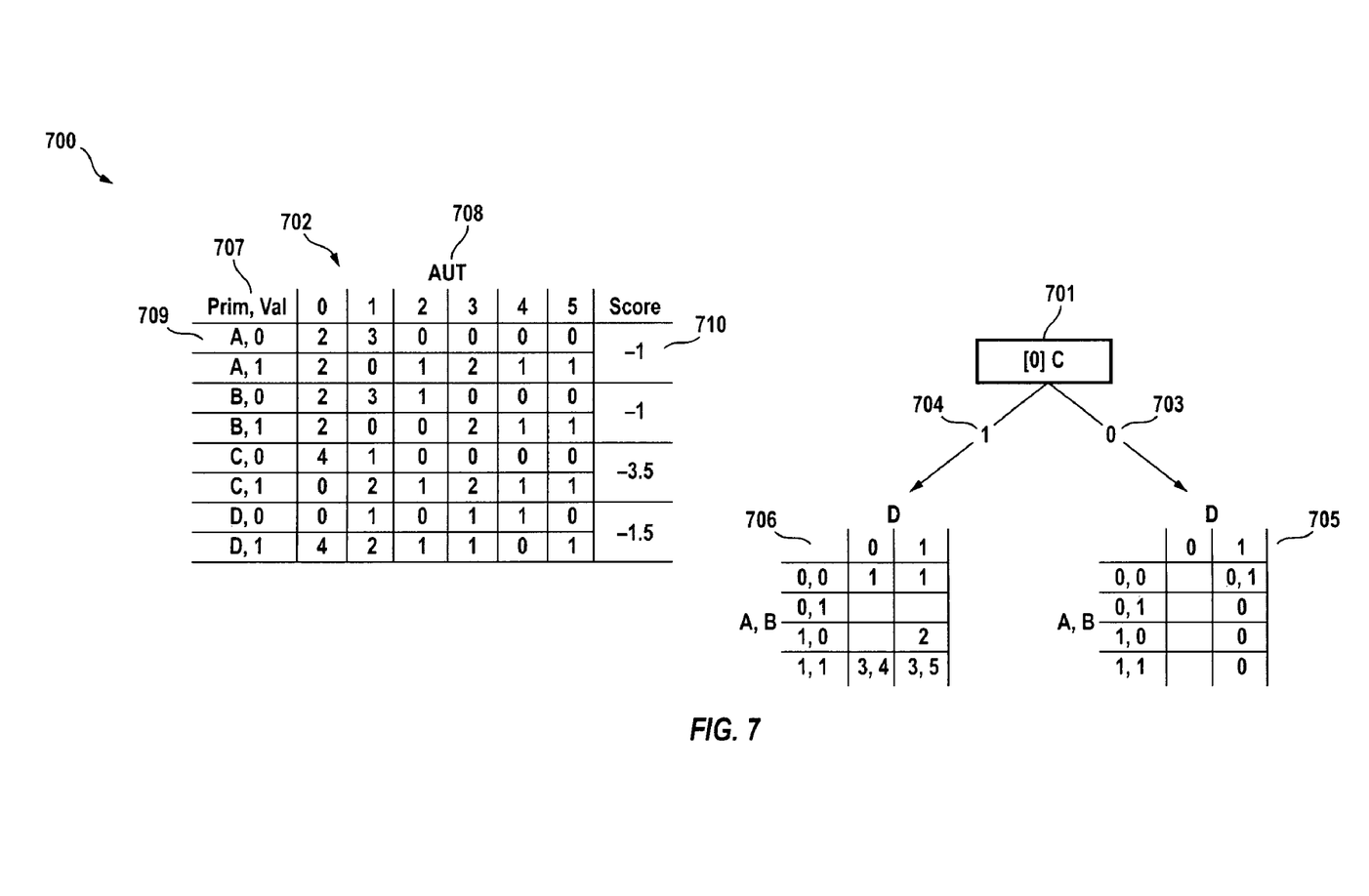
FIG. 7 shows one step in the process of creating a feature tree from a truth table.

FIG. 7

FIG. 7 shows (700) the start of the process for building a feature tree from the truth table in FIG. 6. In particular it shows part of the process for selecting the root node for the tree.

There are many feature trees that can represent a truth table. Some of those feature trees will perform better than others and some will use more or less memory. Performance of a feature tree in a game can depend, at least in part, on the choices of human players as the play. Since those exact choices can not be known in advance, there is no way to guarantee the optimal feature tree that corresponds to a given truth table.

The inventors have therefore discovered a heuristic method that is useful for building feature trees such that the resulting trees are relatively compact and efficient. In particular, a score is assigned to each possible choice of primitive for the root node. The primitive with the highest score is then selected. The whole process is then repeated by creating a new sub-tree at each branch of the chosen primitive. The process continues recursively until the truth table is emptied of expressions. Because of the recursive nature of the method for creating a feature tree it suffices to describe one step.

In one embodiment, the score is determined by looking at the consequences for each expression of splitting on a given primitive. In the FIG. 701) shows the 4 scores that correspond to splitting on each of the 4 possible primitives; A, B, C or D.

The first column (707), labeled "Prim, Val" lists each primitive with each of that primitive's possible values. In the example, each primitive is binary valued so there are 4 primitives times 2 possible values, to give 8 rows. The next 6 columns correspond to each of the AUTs (708) that appear in the truth table of FIG. 6 (600). The number in a cell i, j corresponds to the number of times the AUT corresponding to column j appears in the rows associated with the primitive, value pair corresponding to row i. For example, the primitive, value pair A, 0 is associated with the first two rows of the truth table in (600). That is, the 2 rows of the truth table for which the primitive A is assumed to have the value 0. In those two rows, AUT 0 appears twice and hence the number 2 is entered in the cell indexed by the first row and first column. Similarly, AUT 1 appears 3 times and so the number 3 is entered into the next column. No other AUT appears in any of the columns of the first two rows of the truth table (that correspond to primitive A having the value 0) and so all the other entries in the row are entered as 0. This process is repeated for each cell until all the cells have been filled out.

For each primitive, the score is then determined according to the following formula:

$$\text{sum}((\text{aut\_min}/\text{aut\_max})*\text{count})-(\text{numAUTs}-\text{non-0scores}))$$

Where aut_min is the minimum number of occurrences of an AUT across all possible values of a primitive. Conversely, aut_max is the maximum number of occurrences of an AUT across all possible values of a primitive. For example, there are two cells in the table (702) that correspond to AUT 1 and primitive A. One cell lists 3 occurrences of AUT 1 in the rows of the truth table that correspond to primitive A having value 0, and the other lists 0 occurrences in the case that primitive A has value 1. So in this case aut_min is 0 and aut_max is 3. The count is simply the total number of occurrences of the given AUT across all possible values of the primitive, which in this case is just 3+0=3. numAUTs is just the number of AUTs that appear in the truth table. In this case there are 6 AUTs numbered from 0 to 5, so numAUTs is 6. non-0scores is the number of times an AUT occurred at least once in all possible values of a primitive. For example, for the primitive A, only the first column has non-zero occurrences of AUT 0 in the case that A has value 0 and in the other case that it has value 1.

Using the above formula, the score for primitive A is therefore:

$$((2/2*4)+(0/3*3)+(0/1*1)+(0/2*2)+(0/1*1)+(0/1*1))-(6-1)=-1$$

Intuitively, the score tries to capture how good a job each primitive does on separating the AUTs. The lower the score, the better the job it does. So primitive C has the best score and intuitively looking at the truth table we can see that C separates all the AUTs except for AUT 1. But even there is manages to divide the occurrences of AUT 1 unevenly, which is good because he more uneven the split, the more potential information the primitive is providing about the AUT. One can think of a primitive as a filter that helps sort the expressions, such that the more expressions it succeeds in sending all one way or the other, the better.

After selecting C (702) as the best primitive to split on, then there are two new truth tables that get constructed along each possible path. Along the 0 path (703), which is taken when C is false, the truth table (705) corresponds to the sub-portion of the truth table from FIG. 6 for which C is false. Similarly, the truth table (706) along the other possible path (704) corresponds to the sub-portion from which C is true.

We can proceed recursively to build the entire tree. That is, at each step we have a truth table and we want to determine the best split. The split determines a new truth table for each value of the primitive chosen for the split. Eventually, the truth tables will be emptied of expressions and the process terminates.

There are many other possible ways of determining a score for which primitive to select. For example, the inventors have experimented with using run-time statistics to order primitives in such a way as to reduce the expected number of primitive evaluations. For any given scoring mechanism, a potentially different tree can be created from the same truth table.

Note that, there may be additional constraints between primitives that restrict the order they can appear in a feature tree. For example, a primitive like "distanceTo(nearestEnemy)<10" makes no sense if there are no enemies around. In particular, the application that uses the created feature tree might crash if it attempts to evaluate a primitive that is invalid in some way. Therefore, if there is another primitive like "valid(nearestEnemy)" that checks the validity of some target then this primitive needs to appear higher up in the feature tree. That is, irrespective of scores, target validity tests must be added before any primitives that assume the existence of that target.

Note that, the problem of building a feature tree of the type shown in the figure from a truth table of the type shown in FIG. 6 can be treated as a problem that is independent from any previous steps.

Figure 8:
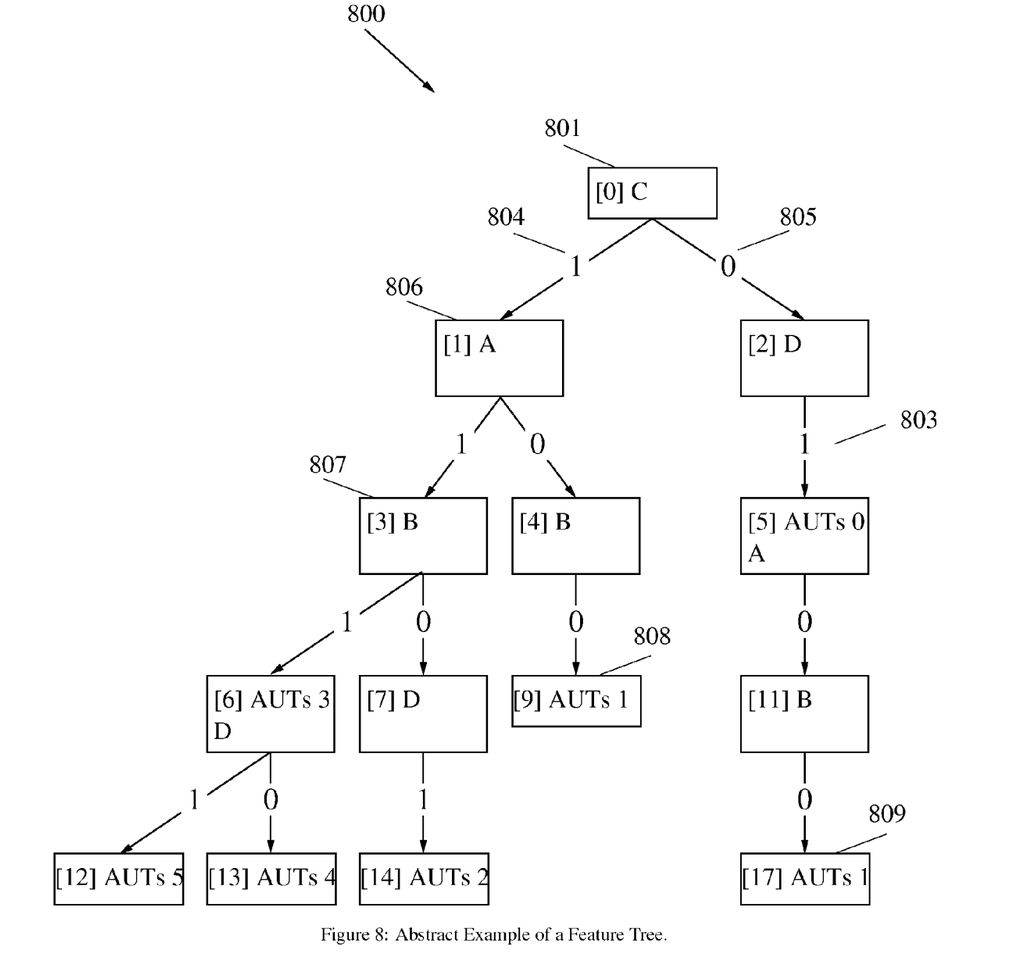
FIG. 8 shows an example of a feature tree that can be constructed from the truth table shown in FIG. 6.

FIG. 8

FIG. 8 shows (800) one possible feature tree that can be built from the truth table in FIG. 6 by the repeated application of the step described in FIG. 7. Different scoring mechanism will obviously lead to different feature trees being generated from the same truth table.

Note that, for the disjunction in expression 1 in FIG. 3 the path (808) covers the case when C is true and D is either true or false. While the path (809) covers the remaining case when C is false and D is true. Obviously, A and B are false in both paths, as required to make the expression 1 true.

Figure 9:
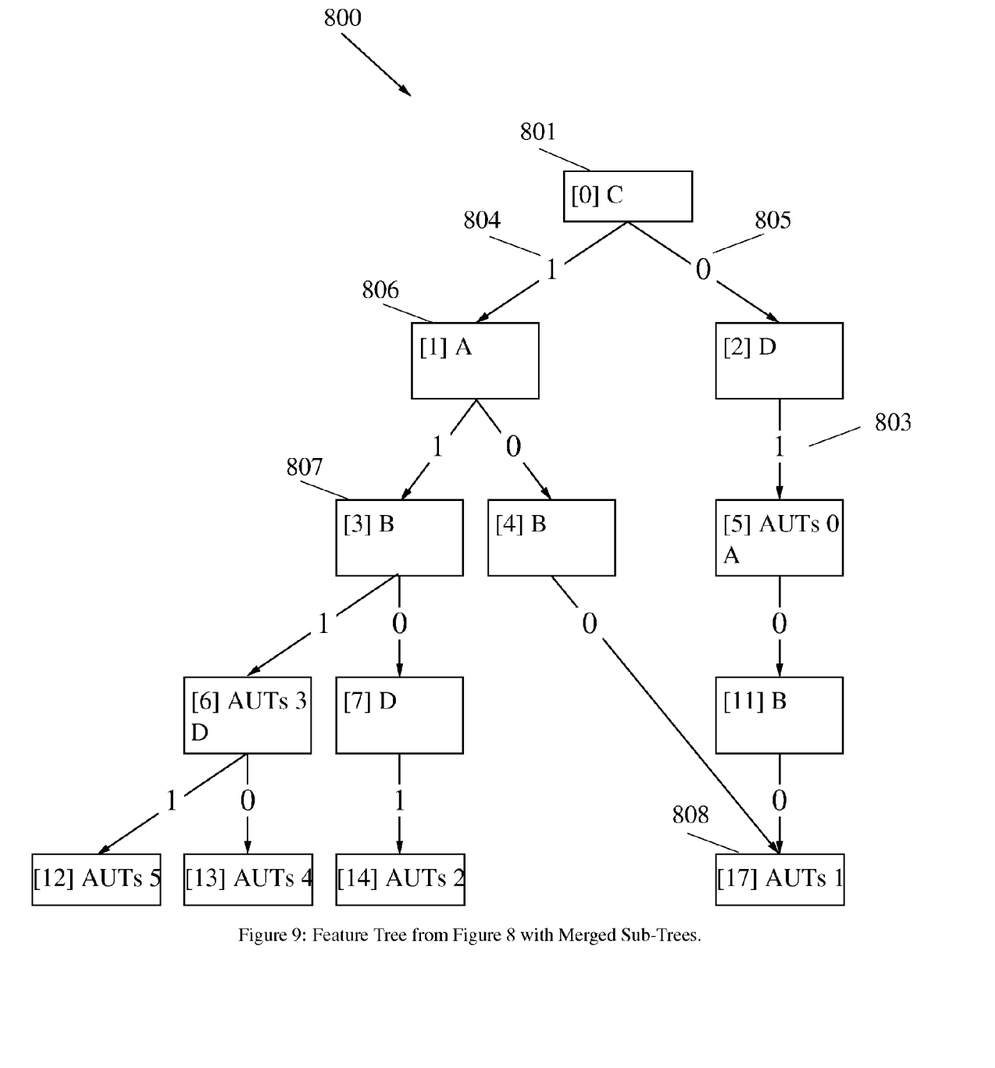
FIG. 9 shows the same tree as FIG. 8, with common subtrees merged.

FIG. 9

The inventors have discovered that by merging common subtrees it is possible to create a directed acyclic graph to represent a given tree. One advantage is that the graph consumes less memory. FIG. 9 (900) shows merging of common subtrees from FIG. 8.

Figure 10:
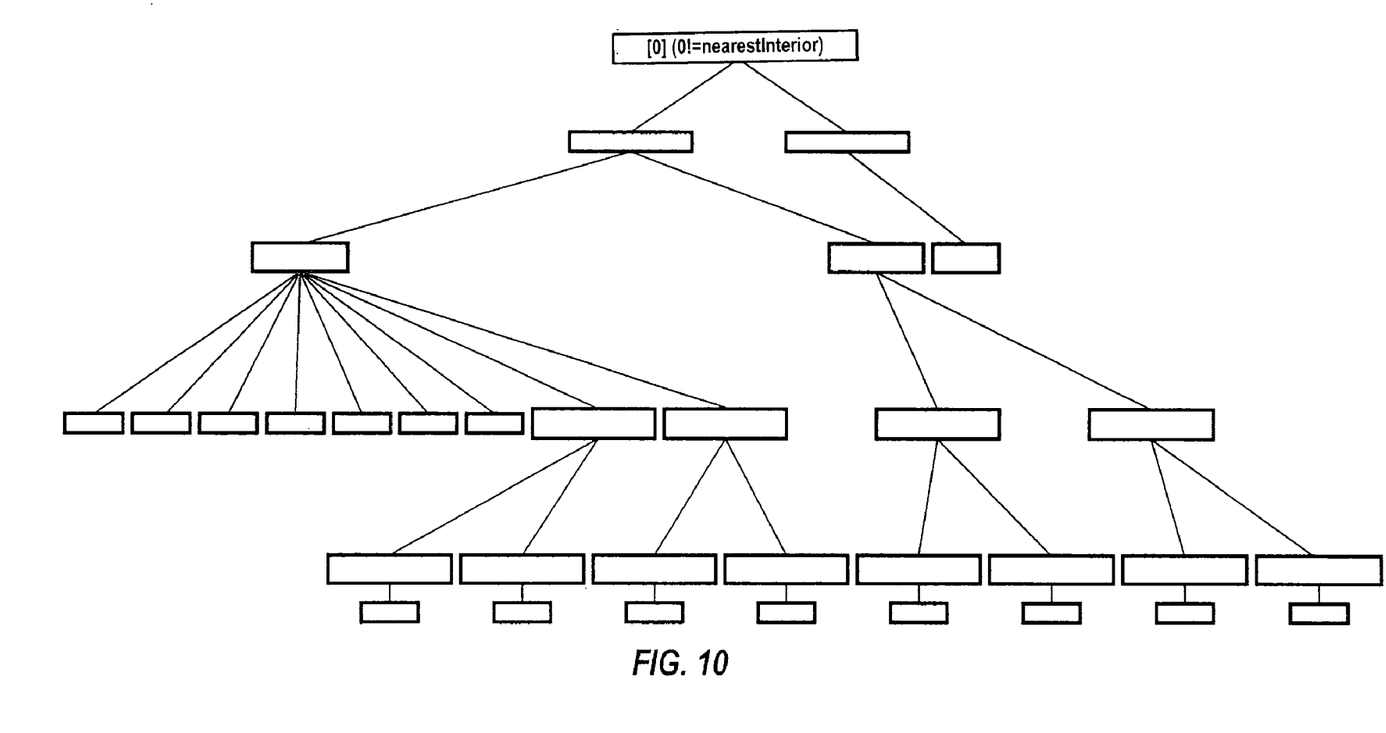
FIG. 10 shows a tree from one embodiment.
Figure 11:
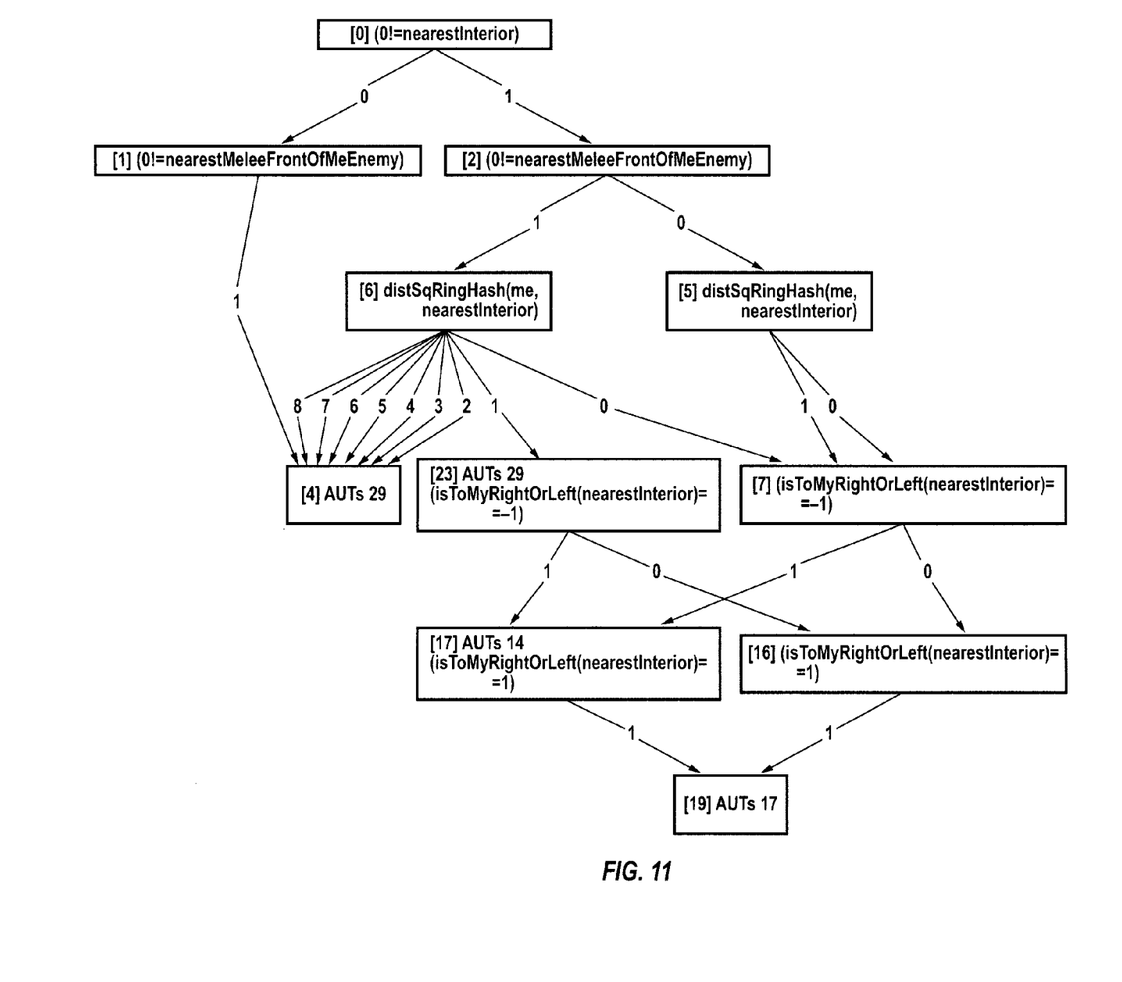
FIG. 11 shows a directed acyclic graph that is equivalent to the tree in FIG. 10 and is obtained by merging the common subtrees.

FIGS. 9 and 10

FIG. 9 shows a feature tree from one embodiment for an application to machine learning in computer games. FIG. 10 shows the equivalent directed acyclic graph obtained from merging common subtrees. One intent of the figures is to show a more dramatic example of subtree merging than FIG. 9.

Hardware Implementation

While one embodiment is implemented in software, it is obviously possible to create hardware for evaluating a set of fixed feature trees. However, there are other known methods for quickly evaluating a set of logical expressions in hardware that do not use the invention. Instead they take advantage of the inherently parallel nature of computation is an electric circuit.

Therefore one advantage of the invention is that for any fixed hardware capable of evaluating the set of logical expressions, the same hardware can be used to evaluate the logical expressions much faster. As a corollary, for a fixed desired performance speed, the invention can be used to reduce the number of gates used in a circuit designed to evaluate a set of logical expressions. Using the invention to reduce the number of gates results in a circuit that uses less power, but that nevertheless achieves the same performance speed.

The invention claimed is:

1. A method of constructing a computing element, the method comprising:
   in response to a set of logical expressions, operating a computing device to determine a set of primitives to which the set of logical expressions are logically responsive;
   in response to the set of logical expressions and the set of primitives, operating a computing device to determine one or more spanning sets of primitives, each such a particular spanning set of primitives having a property that one or more of the logical expressions is a function of primitives included in the particular spanning set and not a function of primitives not included in the particular spanning set;
   in response to the logical expressions that are functions of selected primitives included in each of the particular spanning sets, operating a computing device to determine one or more truth tables responsive to the selected primitives; and
   in response to those truth tables, operating a computing device to determine a partial ordering of evaluation of the primitives;

wherein execution of the partial orderings of evaluation determines which subset of the set of logical expressions is true; and wherein that evaluation is substantially more rapid than sequentially evaluating each of the logical expressions in turn.

2. The method as recited in claim 1, wherein the set of logical expressions are in disjunctive normal form.

3. The method as recited in claim 1, wherein said operating a computing device to determine one or more spanning sets includes selecting a number of the spanning sets substantially fewer than a number of the logical expressions.

4. The method as recited in claim 3, wherein the number of spanning sets is at least approximately two orders of magnitude less the number of the logic expressions.

5. The method as recited in claim 3, wherein said operating a computing device to determine one or more spanning sets includes constructing the spanning sets sequentially so that the spanning sets constructed relatively earlier cover a substantially larger number of the logic expressions than the spanning sets constructed relatively later.

6. The method as recited in claim 5, wherein said operating a computing device to determine one or more spanning sets includes:

for substantially each new spanning set, selecting a set of primitives having properties of:

(a) not already being in any earlier spanning set, and (b) covering at least one of the logic expressions that are not covered by any previously constructed spanning sets.

7. The method as recited in claim 6, wherein a chosen set of primitives covers relatively many of the logic expressions that are not covered by any previously constructed spanning sets.

8. The method as recited in claim 7, wherein the chosen set of primitives covers a substantially maximal number of the logic expressions that are not covered by any previously constructed spanning sets.

9. The method as recited in claim 5, wherein said operating a computing device to determine one or more spanning sets includes processing a set of sequentially constructed spanning sets to reassign one or more of the primitives, to reduce a resulting number of spanning sets.

10. The method as recited in claim 1, wherein the partial ordering of evaluation of the primitives has a property that all of possible orderings of evaluation of the primitives comprise relatively short sequences of primitive evaluations.

11. The method as recited in claim 10, wherein substantially each of the relatively short sequences is approximately the same length as the number of elements in a corresponding spanning set.

12. The method as recited in claim 10, wherein substantially each of the relatively short sequences is no longer than a number of elements in the corresponding spanning set.

13. The method as recited in claim 10, further comprising:

assigning at least some primitives a score; and selecting a next ordering of evaluation in response to the score.

14. The method as recited in claim 13, wherein substantially each of the primitives influencing a relatively larger number of expressions receives a relatively superior score than substantially all of the primitives influencing a relatively smaller number of expressions.

15. The method as recited in claim 13, wherein a first primitive receives an inferior score than a second primitive substantially whenever an evaluation of the first primitive influences substantially more expressions than the second primitive.

16. The method as recited in claim 13, wherein a first primitive receives a higher score than a second primitive substantially whenever the first primitive is empirically discovered, to be evaluated substantially more frequently than the second primitive.

17. The method as recited in claim 13, wherein a first primitive receives a higher score than a second primitive substantially in response to two or more of the following:

(a) the first primitive receives an inferior score than the second primitive substantially whenever the first primitive can only be evaluated after the second primitive;

(b) the first primitive receives an inferior score than the second primitive substantially whenever an evaluation of the first primitive influences substantially more expressions than the second primitive;

(c) the first primitive receives a higher score than the second primitive whenever the first primitive is empirically discovered, to be evaluated substantially more frequently than the second primitive.

18. The method as recited in claim 1, wherein said selecting a next ordering is responsive to one or more semantic constraints between or among the primitives.

19. The method as recited in claim 18, wherein a first primitive receives an inferior score than a second primitive substantially whenever that first primitive can only be evaluated after that second primitive.

20. The method as recited in claim 1, wherein said operating a computing device to determine a partial ordering of evaluation has a property that all possible orderings of evaluation of the primitives comprise, on average, a relatively short sequence of primitive evaluations.

21. The method as recited in claim 1, wherein at least some of the orderings of evaluation are represented in a physical medium.

22. A non-transitory computer-readable physical medium maintaining a set of instructions interpretable by a computing device, the instructions comprising:

instructions, in response to a set of logical expressions, directing a computing device to determine a set of primitives to which the set of logical expressions are logically responsive;

instructions, in response to the set of logical expressions and the set of primitives, directing a computing device to determine one or more spanning sets of primitives, each such a particular spanning set of primitives having a property that one or more of the logical expressions is a function of the primitives included in the particular spanning set and not a function of the primitives not included in that particular spanning set;

instructions, in response to the logical expressions that are functions of elected primitives included in each of the spanning sets, directing a computing device to determine one or more truth tables responsive to the selected primitives; and instructions, in response to the truth tables, directing a computing device to determine a partial ordering of evaluation of the primitives.

23. The physical medium as recited in claim 20, wherein said maintaining a set of instructions interpretable by a computing device, further includes instructions with a computing element as made by a method as in claim 1.

* * * * *